United States Patent [19]

Kelly

[11] 4,223,907
[45] Sep. 23, 1980

[54] SEPARABLE MORTAR VEHICLE

[76] Inventor: Thomas M. Kelly, 7551 N. Oakley Ave., Chicago, Ill. 60645

[21] Appl. No.: 968,307

[22] Filed: Dec. 11, 1978

[51] Int. Cl.³ .............................................. B60D 7/00
[52] U.S. Cl. ................................ 280/408; 280/47.18; 280/47.2; 298/8 T
[58] Field of Search ................ 280/47.17, 47.12, 47.2, 280/47.34, 400, 408, 659, 79.2; 298/8 H, 8 T

[56] References Cited

U.S. PATENT DOCUMENTS

| 2,371,811 | 3/1945 | Ericsson | 280/408 |
| 3,258,275 | 6/1966 | Schaefer et al. | 280/47.2 |
| 3,460,850 | 8/1969 | Franklin | 280/47.2 |
| 3,726,535 | 4/1973 | Longato | 280/408 X |
| 3,944,258 | 3/1976 | Christensen | 280/408 |

FOREIGN PATENT DOCUMENTS 10211  7/1884  United Kingdom ................. 280/47.18

Primary Examiner—John J. Love
Assistant Examiner—Michael Mar
Attorney, Agent, or Firm—Edward D. Gilhooly

[57] ABSTRACT

A hand operated vehicle for the transportation of materials at construction job sites which is capable of receiving and containing increased material loads. The vehicle may be transported from a supply point to a disbursing point in a unitary configuration, whereupon it may be separated into component parts. The components may be manuevered to separate utilization points by a single man, the weight of each component not exceeding the weight which supporting scaffolding can safely sustain.

13 Claims, 6 Drawing Figures

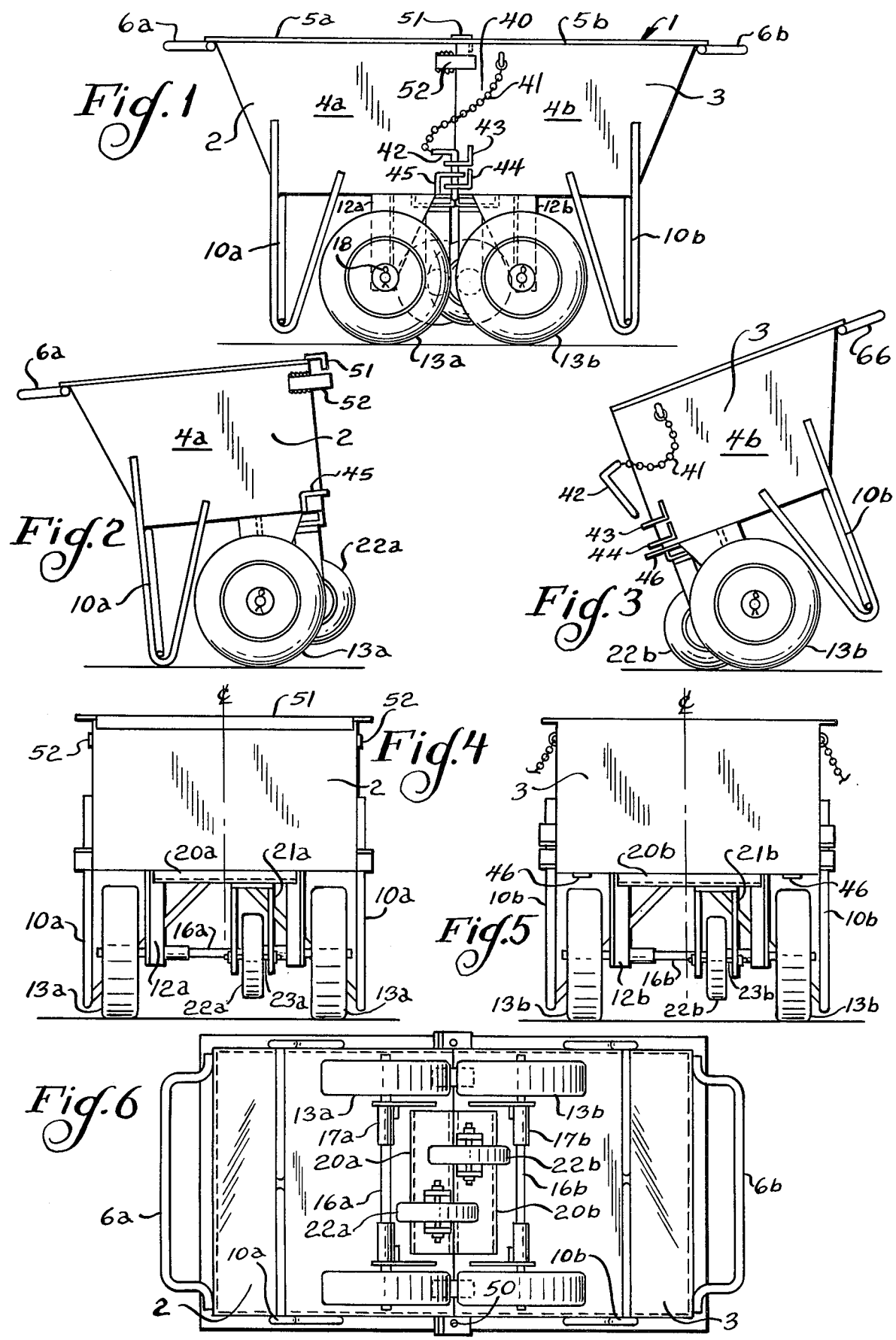

SEPARABLE MORTAR VEHICLE

BACKGROUND OF THE INVENTION

This invention relates in general to hand operated vehicles and, in particular, to hand operated vehicles for the transportation of materials at construction job sites.

More specifically, this invention relates to hand operated vehicles for conveying soil, concrete of mortar to desired locations at construction job sites. While this invention has general application as a hand operated vehicle for conveying materials, for convenience of illustration the preferred embodiment will be described with reference to a mortar cart or buggy for the delivery of mortar to brick or stone masons, although it is not intended to be limited thereto.

The construction of a structure having brick or cinder block walls or partitions normally entails initially laying a supporting foundation, basememt or the like. As the structure progresses from the foundation level upwardly by the addition of progressive layers of bricks or cinder blocks, it is necessary to erect scaffolding to enable the brick masons to stay at the wall level. This scaffolding not only supports the brick masons but also the bricks, mortar and necessary work tools.

It is common in the construction industry to make a standard mix of mortar having a volume of approximately 9 cubic feet. This mortar is conveyed from the mixing point to the respective utilization points in what is known as a mortar buggy or cart such as disclosed in U.S. Pat. No. 1,513,469 issued to A. P. Robinson, or in U.S. Pat. No. 2,102,684 issued to R. B. Dorward. However, the disadvantages of using these carts lies in that they individually cannot handle an entire 9 cubic foot mix which necessitates a multiplicity of delivery runs from the mixing point to the utilization point or, in the alternative, requires the purchase of several additional mortar buggies. Therefore, to improve the economic efficiency of the bricklaying operation, it is desirous to deliver the entire 9 cubic foot mix to the appropriate work site as quickly as possible. However, the excessive weight of this volume of mortar cannot be transported by one individual using prior art hand operated vehicles. Additionally, the weight of a standard mix of mortar is more than the aforementioned scaffolding can safely sustain. Accordingly, known vehicles for transporting mortar from supply locations to a work location area are deficient in permitting an entire mix of mortar to be delivered to the point of use and divided for utilization at different locations with safe support on the scaffolding.

SUMMARY OF THE INVENTION

Therefore, it is an object of this invention to improve hand operated vehicles.

Another object of this invention is to improve hand operated vehicles for the transportation of materials to construction job sites.

A further object of this invention is to increase the capacity of hand operated vehicles for the transportation of materials at construction job sites.

Still another object of this invention is to improve hand operated vehicles for transporting mortar from supply locations to utilization points.

Yet another object of this invention is to deliver mortar from the mortar mixing point to the utilization point in a vehicle which may be maneuvered by one man.

A still further object of this invention is to deliver mortar from the mortar mixing point to the utilization point in a hand operated vehicle which will not exceed the weight bearing capacity of the scaffolding.

These and other objects of the invention are attained in accordance with the present invention wherein there is provided a hand operated vehicle for the transportation of materials at construction job sites which is capable of receiving and containing increased material loads. The vehicle may be transported from a supply point to a disbursing point in a unitary configuration, whereupon it may be separated into component parts. The components may be maneuvered to separate utilization points by a single man, the weight of each component not exceeding the weight which supporting scaffolding can safely sustain.

DESCRIPTION OF THE DRAWINGS

Further objects of this invention, together with additional features contributing thereto and advantages accruing therefrom will be apparent from the following description of one embodiment of the invention when read in conjunction with the accompanying drawings wherein:

FIG. 1 is a side elevational view of a mortar buggy having two separable segments showing the segments locked together;

FIG. 2 is a side elevational view of the left segment of the mortar buggy disconnected from the right segment and shown in the standing position;

FIG. 3 is a side elevational view of the right segment of the mortar buggy disconnected from the left segment and shown in the transporting position;

FIG. 4 is an end elevational view of the left segment of the mortar buggy disconnected from the right segment and shown in the transporting position;

FIG. 5 is an end elevational view of the right segment of the mortar buggy disconnected from the left segment and shown in the transporting position; and FIG. 6 is a bottom plan view of the mortar buggy showing the left and right segments locked together.

DESCRIPTION OF THE PREFERRED EMBODIMENT

In FIG. 1, there is shown a mortar buggy depicted generally by the numeral 1 having a first separable portion shown generally by the numeral 4a and a second separable portion shown generally by the numeral 4b. As will be apparent from the following description, portions 4a and 4b may be selectably coupled together to function as a single unitary vehicle for conveying material or may be separated as desired to act as two independent vehicles. Each of the portions 4a, 4b has a body 2, 3 formed from metal into a recessed or bucket shape for receiving concrete, mortar and the like. Typically, mortar buggies are subjected to relatively abusive treatment while in use. Therefore, each of the bodies 2, 3 is provided with a reinforcing lip 5a and 5b secured to their respective upper edges.

Handles 6a, 6b are attached to bodies 2, 3 near their upper edges immediately adjacent the reinforcing edges 5a and 5b to facilitate the moving and steering of the mortar buggy 1 as a whole, or each of the portions 4a, 4b individually. A pair of support members 10a, 10b are attached to portions 4a and 4b to form a stand for supporting the aforementioned portions when detached from one another and not in use, as is best shown in FIG. 2. Wheel pairs 13a, 13b are attached to a pair of support members 12a, 12b, respectively, and cooperate therewith to support portions 4a, 4b in both the connected and disconnected positions and, additionally, to facilitate the movement thereof at the construction job site.

The manner in which the individual portions of the mortar buggy 1 are locked in alignment is best illustrated in FIGS. 2 through 4. Channel member 51, secured to the forward edge of body 2 and extending the length thereof, fits over the corresponding forward edge of body 3 and cooperates therewith in positioning separable portions 4a, 4b in vertical alignment. In a similar fashion, a pair of brackets 46 attached to the bottom portion of body 3 and extending horizontally outwardly therefrom rest against the corresponding bottom portion of body 2 and assist channel member 51 in holding the two portions 4a, 4b in vertical alignment. A pair of brackets 52 attached to the upper side portions of body 2 and extending horizontally outwardly therefrom position themselves against the corresponding side portions of body 3 to cooperate therewith in maintaining separable portions 4a and 4b in horizontal alignment.

The manner in which separable portions 4a, 4b of mortar buggy 1 are locked together is best illustrated in FIGS. 1 through 3. A pair of coupling members in the form of angle brackets 43, 44 are secured to each of the lower right and left side portions of the body 3. An angle bracket 45 is secured to each of the lower right and left side portions of the body 2. When portions 4a, 4b are positioned together as shown in FIG. 1, holes formed in brackets 43, 44 and 45 are in horizontal and vertical alignment and cooperate with one another in receiving a pair of locking pins 42 which are secured to the right and left sides of body 3 by a pair of chains 41. In this configuration, the mortar buggy 1 may be operated as a single unit, being filled with mortar at the mortar dispersing point, transported to the utilization point and elevated to the scaffolding, for example, by a fork lift. The locking pins 42 may then be removed from the brackets, and the separable portions 4a, 4b may be maneuvered by a single individual to any desired location on the scaffolding.

The undercarriage structure for supporting and transporting the mortar buggy or the portions 4a, 4b is best illustrated in FIGS. 4 through 6. Supporting members 12a, 12b have holes formed therein which are adapted to receive bushing pairs 17a, 17b. Axles 16a, 16b are longitudinally disposed within each of the bushing pairs 17a, 17b, respectively. Wheel pairs 13a, 13b are inserted over each of the extended ends of the axles 16a, 16b and secured in place by means of cotter pins 18.

Each of the portions 4a, 4b has a smaller wheel 22a, 22b attached thereto to provide a third surface contact point for stabilization of the individual segments when not locked together in a unitary configuration. Wheel 22a is secured to the bottom surface of body 2 by means of a reinforcing channel 20a to which is attached a downwardly extending support member 21a. Similarly, wheel 22b is secured to the bottom surface of body 3 by means of reinforcing channel 20b and downwardly extending support member 21b. Each of the downwardly extending support members 21a, 21b has holes formed therein which are adapted to receive axle members 23a, 23b, about which wheels 22a, 22b rotate, respectively. As is best shown in FIG. 6, wheels 22a, 22b are laterally offset so as to allow the mortar buggy portions 4a, 4b to be locked together and transported as a single unit.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A separable hand operated vehicle comprising a plurality of separable portions adapted to be positioned and moveable on a support surface as a unitary unit or as separate units, each of said separable portions further including body means having a recessed shape adapted to receive and contain material, said separable portions each further including first support means to aid in maintaining said plurality of said separable portions in an uprtight position when stationary and permit movement thereof in response to application of force, said first support means including at least one rotatably mounted first wheel member respectively coupled to each of said separable portions, said separable portions each further including second support means for cooperating with said first support means to permit movement of said separable portions as separate units, said second support means includes at least one second rotatably mounted wheel member respectively coupled to each of said separable portions, stationary support means operatively coupled to each of said separable portions, said stationary support means being arranged to be out of contact with the support surface during movement of the separate portions as a unitary unit or as separate units, said stationary support means acting to contact the support surface while each of said separate portions are stationary as separate units, handle means secured to each of said separable portions for manipulating each portion as a unitary unit and as separate units by applying a force thereto, securement means for releasably securing said plurality of said separable portions as a unitary unit, said at least one first wheel member of each of said separable portions acting to contact the support surface with said at least one second wheel member being out of contact therewith during manipulation to move said separable portions as an unitary unit, and said at least one first wheel member and second wheel member of each of said separable portions acting to contact the support surface during manipulation to move said separable portions as separate units.

2. The hand operated vehicle as defined in claim 1, wherein the securement means includes a plurality of coupling members operatively secured to said separable portions for operative connection to a portion of said separable portions.

3. The hand operated vehicle as defined in claim 1, wherein said at least one second wheel member of said separable portions are offset on opposite respective sides of the lateral center line of said separable portions to effect securement of said plurality of said separable portions to one another.

4. The hand operated vehicle as defined in claim 3 wherein said at least one second wheel member of one of said separable portions is in substantial alignment with at least one second wheel member of another of said separable portions in securement of said separable portions as a unitary unit.

5. The hand operated vehicle as defined in claim 4 wherein said at least one second wheel member of said separable portions extends beyond its respective separable portion to increase stability of said separable portions as separate units.

6. The hand operated vehicle as defined in claim 1 further comprising alignment means coupled to each of said separable portions for positioning said first and second portions in horizontal and vertical alignment relative to each other.

7. The hand operated vehicle as defined in claim 6 wherein said alignment means includes at least one bracket means mounted at the top of the body means of one of said separable portions and the bottom of the body means of another one of said separable portions.

8. The hand operated vehicle as defined in claim 6, wherein the alignment means of one of said portions includes bracket means protruding therefrom to engage a peripheral portion of the other of said plurality of separable portions for alignment therebetween.

9. The hand operated vehicle as defined in claim 8, wherein the alignment means includes at least one first bracket means for effecting horizontal alignment of said separable portions.

10. The hand operated vehicle as defined in claim 8, wherein the alignment means includes at least one second bracket means for effecting vertical alignment of said separable portions.

11. The hand operated vehicle as defined in claim 10, wherein the securement means further includes generally elongated pin means for selective engagement with the coupling members for releasably connecting said separable portions.

12. The hand operated vehicle as defined in claim 11 wherein said coupling members include at least one bracket respectively coupled to said separable portions.

13. The hand operated vehicle as defined in claim 11 wherein said coupling members include at least one bracket member respectively coupled to each side of said separable portions.

* * * * *